Patented July 27, 1926.

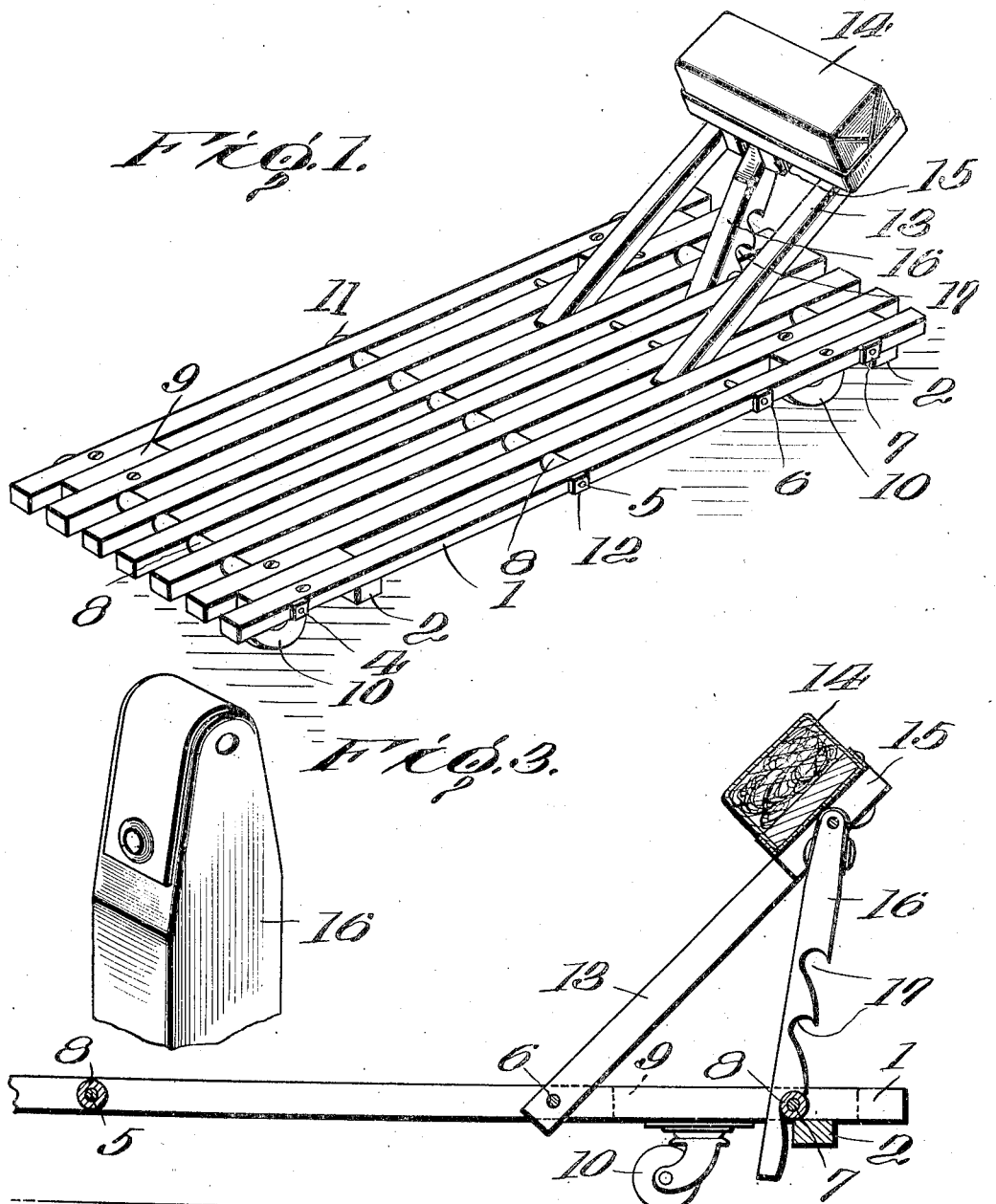

1,593,801

UNITED STATES PATENT OFFICE.

EDWARD F. KOCH, OF FORT RECOVERY, OHIO.

CREEPER.

Application filed June 30, 1924. Serial No. 723,236.

This invention relates to certain new and useful improvements in creepers, especially adapted to be used by mechanics in repairing motor vehicles, the object being to provide a creeper with an adjustable head rest which can be raised and lowered by the mechanic at work so as to rest his head in the desired position.

Another and further object of the invention is to provide a creeper which is exceedingly simple and cheap in construction and one which is very strong and durable in use.

Other and further objects and advantages of the invention will be hereinafter set forth and the novel features thereof defined by the appended claims.

In the drawings,

Figure 1 is a perspective view of a creeper constructed in accordance with my invention;

Figure 2 is a detail vertical section; and

Figure 3 is a detail perspective view.

In carrying out my invention I employ a body which is formed of a series of spaced bars 1 connected together at their ends by cross bars 2. The bars 1 are preferably rectangular in cross section and are also secured together by rods 4, 5, 6 and 7, the rods 4, 5 and 7 being provided with spacing sleeves 8 so as to hold the bars 1 in spaced relation with one another and provide a body in which the mechanic can lie when at work under a motor vehicle.

Arranged between the outer bars of the body at each corner are blocks 9 and secured to these blocks and the adjacent bars are casters 10 so as to allow the body to be readily moved by the operator into the desired position under the motor vehicle to that he can work on the motor vehicle in repairing the same.

The rods 4, 5, 6 and 7 are provided with heads 11 at one end and carry nuts 12 at their opposite ends so that the bars forming the body can be placed under tension.

Pivotally mounted on the rod 6 are a pair of arms 13 carrying at their outer ends a head rest 14. Secured to the under side of the head rest 14 are a pair of spaced blocks 15 between which is pivotally mounted the upper end of a rack bar 16 which is provided with under-cut notches 17 which are adapted to cooperate with one of the spacing sleeves carried by the rod 7 and as the head rest is so mounted that the rack bar drops by gravity into engagement with the spacing sleeve, the head rest can be readily adjusted by the mechanic while lying on the creeper as it is only necessary for him to release the pressure on the head rest and to move the rack bar out of engagement with the spacing sleeve to adjust the head rest at any desired position.

When the head rest is in full raised position, by raising the head rest upwardly and holding the rack bar away from the spacing sleeve, it can be dropped to the desired position and when the head rest is in lowered position, it is only necessary to raise the same upwardly as the rack bar rides over the spacing sleeves so as to lock the head rest in the desired position.

I am aware that I am not the first in the art to provide a creeper with an adjustable head rest, but in the prior constructions it is impossible to adjust the head rest when the mechanic is lying on the creeper and I have found that by constructing an adjustable head rest in this particular manner, the mechanic can readily adjust the same while still at work so as to support his head in the desired position.

What I claim is:—

1. A creeper comprising a series of parallelly arranged bars secured together by cross bars and transversely arranged rods, spacing sleeves arranged on said rods between said bars, a pair of arms pivotally mounted on one of said rods carrying a head rest and a pivoted ratchet carried by said head rest adapted to engage a spacing sleeve in one of said rods.

2. A creeper of the kind described comprising a series of parallelly arranged bars connected together by cross bars to form a body, casters for supporting said body, rods extending transversely through said cross bars having nuts on their ends, spacing sleeves mounted on said rods between said bars, a pair of arms pivotally mounted on one of said rods carrying a head rest and a ratchet bar pivotally carried by said head rest adapted to work between a pair of said bars and engage one of the spacing sleeves for holding said head rest in adjusted position.

In testimony whereof I hereunto affix my signature.

EDWARD F. KOCH.